(12) United States Patent
Ferguson et al.

(10) Patent No.: US 8,627,860 B2
(45) Date of Patent: *Jan. 14, 2014

(54) FUEL COUPLER WITH WIRELESS PORT DOOR UNLATCHING ACTUATOR

(75) Inventors: Joshua Willard Ferguson, Alameda, CA (US); Daryl Zalan, San Francisco, CA (US); Andrew Dai, Acton, MA (US); Troy Adam Nergaard, San Francisco, CA (US); Nicholas Robert Kalayjian, San Carlos, CA (US); Scott Ira Kohn, Redwood City, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/490,164

(22) Filed: Jun. 6, 2012

(65) Prior Publication Data

US 2013/0074411 A1 Mar. 28, 2013

Related U.S. Application Data

(63) Continuation of application No. 13/489,617, filed on Jun. 6, 2012, which is a continuation-in-part of application No. 13/482,900, filed on May 29, 2012.

(60) Provisional application No. 61/540,303, filed on Sep. 28, 2011, provisional application No. 61/540,441, filed on Sep. 28, 2011, provisional application No. 61/540,550, filed on Sep. 29, 2011.

(51) Int. Cl.
*B67C 3/02* (2006.01)
*B62D 25/00* (2006.01)
*F01M 11/04* (2006.01)
*B60K 15/05* (2006.01)

(52) U.S. Cl.
CPC ............ *F01M 11/0458* (2013.01); *B60K 15/05* (2013.01)
USPC .............................. 141/98; 296/97.22; 70/264

(58) Field of Classification Search
USPC ........................ 141/83, 94, 98, 192; 292/144; 296/97.22; 70/264
See application file for complete search history.

(56) References Cited

U.S. PATENT DOCUMENTS

| | | | | |
|---|---|---|---|---|
| 5,072,986 A | * | 12/1991 | Tai et al. ..................... | 296/97.22 |
| 5,664,811 A | * | 9/1997 | Martus et al. ................. | 292/144 |
| 5,699,685 A | * | 12/1997 | Jahrsetz et al. ................. | 70/264 |
| 5,802,894 A | * | 9/1998 | Jahrsetz et al. ................. | 70/264 |
| 6,234,557 B1 | * | 5/2001 | Bae ............................. | 296/97.22 |
| 6,237,647 B1 | | 5/2001 | Pong et al. | |
| 6,408,901 B2 | * | 6/2002 | Holloway et al. ............. | 141/301 |
| 6,761,194 B1 | * | 7/2004 | Blong ............................ | 141/98 |
| 6,834,688 B2 | | 12/2004 | Ono et al. | |
| 7,171,989 B2 | * | 2/2007 | Corless et al. ................... | 141/2 |

(Continued)

*Primary Examiner* — Timothy L Maust
(74) *Attorney, Agent, or Firm* — J. Richard Soderberg

(57) ABSTRACT

A fuel delivery system and method of use are provided that may be used to open the door covering the charge port of an electric vehicle, or the door covering the fuel filler port of a conventional vehicle. The system includes a fuel coupler (e.g., a charging connector or a gas nozzle) designed to transfer fuel from the source to the vehicle via the vehicle's fuel port. The fuel coupler includes a switch that when toggled, causes a control signal to be wirelessly transmitted over a short distance. Upon receipt of the control signal by a receiver integrated into a vehicle that is in close proximity to the fuel port, an unlatching actuator within the vehicle unlatches the port door, thereby allowing it to open and provide port access.

18 Claims, 6 Drawing Sheets

(56) References Cited

U.S. PATENT DOCUMENTS

| | | | |
|---|---|---|---|
| 7,671,482 B2* | 3/2010 | Tighe | 307/9.1 |
| 8,360,117 B2* | 1/2013 | Hajiaghajani | 141/94 |
| 8,382,187 B2* | 2/2013 | Guendouz et al. | 296/97.22 |
| 2009/0079225 A1* | 3/2009 | Katou | 296/97.22 |
| 2009/0242291 A1 | 10/2009 | Sagawa et al. | |
| 2010/0065147 A1* | 3/2010 | Gerard et al. | 141/4 |
| 2010/0265033 A1 | 10/2010 | Cheung | |
| 2011/0115239 A1* | 5/2011 | Imatomi et al. | 292/143 |

\* cited by examiner

FUEL COUPLER WITH WIRELESS PORT DOOR UNLATCHING ACTUATOR

CROSS-REFERENCE TO RELATED APPLICATION

This application is a continuation of U.S. patent application Ser. No. 13/489,617, filed 6 Jun. 2012, and a continuation-in-part of U.S. patent application Ser. No. 13/482,900, filed 29 May 2012, the disclosures of which are incorporated herein by reference for any and all purposes. U.S. patent application Ser. No. 13/482,900, filed 29 May 2012, claims the benefit of the filing date of U.S. Provisional Patent Application Ser. No. 61/540,303, filed 28 Sep. 2011, Pat. No. 61/540,441, filed 28 Sep. 2011 and Ser. No. 61/540,550, filed 29 Sep. 2011, the disclosures of which are incorporated herein by reference for any and all purposes.

FIELD OF THE INVENTION

The present invention relates generally to vehicles and, more particularly, to the port assembly of a vehicle, where the port corresponds to either a fuel filler port or a charge port.

BACKGROUND OF THE INVENTION

All vehicles have an externally located port assembly, regardless of whether the vehicle is a conventional vehicle and the port is a fuel filler port, or the vehicle is an electric or plug-in hybrid vehicle and the port is a charge port. The port assembly provides the user with easy access in order to fill the fuel tank with gas, or charge the on-board battery pack. A port door is used to protect the port from weather as well as possible tampering. In general, the same type of door latch and release assemblies are used for both charge port and fuel filler doors.

A variety of different mechanisms have been used to hold the port door of a vehicle in a closed position. Often the door is spring loaded toward an open position, thus causing the door to open, or at least partially open, when the latch is released. U.S. Pat. No. 4,917,418 discloses one type of latching mechanism in which a spring loaded latch is designed to engage a notch in the spring loaded door. The spring loaded latch can be pulled, thus releasing the door, using a remote release lever mounted in the passenger cabin or the trunk. The release lever is coupled to the spring loaded latch via a cable.

U.S. Pat. No. 5,044,678 discloses an alternate release system for use with a spring loaded latch and a spring loaded door. As disclosed, the system uses a compact solenoid assembly that may be activated using a switch mounted in the passenger compartment. The disclosed solenoid assembly is self-compensating in order to reduce the required armature travel distance and thus the size of the solenoid, thereby allowing a reduction in the size, weight and cost of the assembly.

In order to further reduce cost while retaining the style advantages of a flat hidden door with no visible finger opening, U.S. Pat. No. 5,836,638 discloses a fuel door assembly with a push-push lock that eliminates the need for either a solenoid or cable remote latching mechanism. The disclosed push-push lock has two positions; a first position that holds the door in a completely closed position and a second position that holds the door in a partially open position, thereby allowing the door edge to be grasped and manually opened.

U.S. Pat. No. 6,739,633 discloses an alternate fuel filler door actuator that utilizes a motor and gear train to move the door latch between the locked and unlocked positions. Although the primary actuation system is an electric motor, the use of a manual override cable to manually move the latch from the locked to unlocked positions is also described.

The present invention provides an alternate port door unlatching system that is activated remotely prior to attaching a fuel coupler (e.g., a charge connector or a gas nozzle) to the filler port.

SUMMARY OF THE INVENTION

The present invention provides a fuel delivery system comprised of a fuel coupler connected to a fuel source, where the coupler is configured to be coupled to a vehicle fuel port in order to transfer fuel from the fuel source to the vehicle via the fuel port; a short range transmitter configured to wirelessly transmit a vehicle port door control signal; and a transmitter switch integrated into the fuel coupler, where toggling the switch causes the transmitter to wirelessly transmit the vehicle port control signal, where receipt of the vehicle port door control signal by a receiver located within the vehicle activates a port door unlatching actuator that opens a vehicle port door, where the vehicle port door covers the vehicle fuel port when it is in a closed position and provides access to the vehicle fuel port when it is in an open position. Toggling the switch may cause the transmitter to wirelessly transmit the control signal for a preset period of time, or for as long as the switch is toggled. In at least one embodiment, the fuel port is a charge port electrically connected to a vehicle battery pack, the fuel source is a charging source of electrical power, and the fuel coupler is a charging connector. In at least one embodiment, the fuel port is a filler port connected to a vehicle fuel tank, the fuel source is a source of gasoline, and the fuel coupler is a gas nozzle connected to the gasoline source via a gasoline pump.

The transmitter of the fuel delivery system may have a data transmission range of less than 4 meters; an output power of less than 10 watts; and/or an output power of less than 1 watt. The on-board receiver may be configured to require a line-of-sight with the transmitter in order to receive the control signal. The system may further comprise a directional antenna integrated into the fuel coupler and electrically connected to the transmitter.

In at least one embodiment, the vehicle may be any vehicle of a plurality of vehicles manufactured by a specific manufacturer and configured to receive the vehicle port door control signal and activate the port door unlatching actuator in response to the vehicle port door control signal. In at least one embodiment, the vehicle may be any vehicle of a plurality of vehicles of a particular model and manufacturer.

In another aspect, the present invention provides a method of operating a fuel delivery system, the method comprising the steps of providing a fuel coupler connected to a fuel source, where the coupler is configured to be coupled to a vehicle fuel port in order to transfer fuel from the fuel source to the vehicle via the fuel port; providing a switch integrated into the fuel coupler, where toggling the switch from a first position to a second position further comprises the step of transmitting a vehicle port door control signal from a directional antenna integrated into the fuel coupler, wherein receipt of the port door control signal by a receiver integrated into a vehicle proximate to the fuel coupler further comprises the step of activating a port door unlatching actuator that opens a vehicle port door, where the vehicle port door covers the vehicle fuel port when it is in a closed position and provides access to the vehicle fuel port when it is in an open position. Toggling the switch may cause the transmitter to wirelessly transmit the control signal for a preset period of time, or for as long as the switch is toggled. In at least one embodiment, the fuel port is a charge port electrically connected to a vehicle battery pack, the fuel source is a charging source of electrical power, and the fuel coupler is a charging connector. In at least one embodiment, the fuel port is a filler port connected to a vehicle fuel tank, the fuel source is a source of gasoline, and the fuel coupler is a gas nozzle connected to the gasoline source via a gasoline pump.

A further understanding of the nature and advantages of the present invention may be realized by reference to the remaining portions of the specification and the drawings.

DESCRIPTION OF THE SPECIFIC EMBODIMENTS

Figure 1:
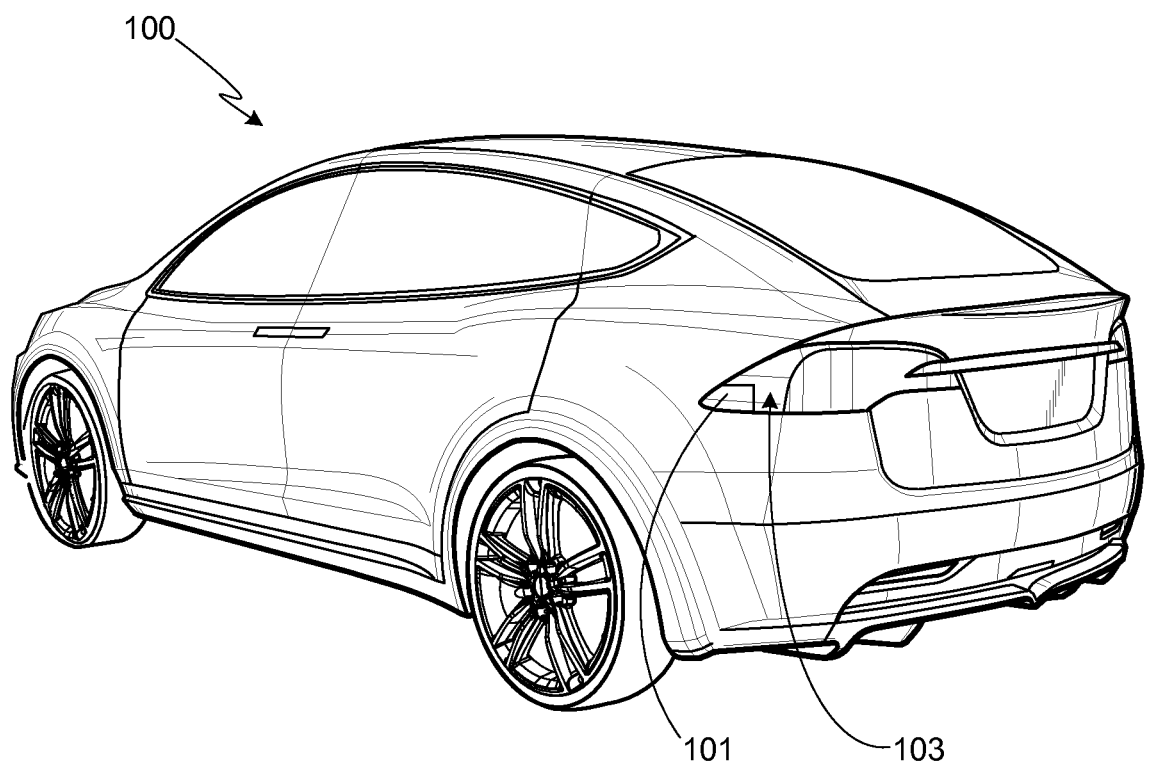
FIG. 1 illustrates the charge port access door of an electric vehicle where the port assembly is integrated into the lamp assembly.
Figure 2:
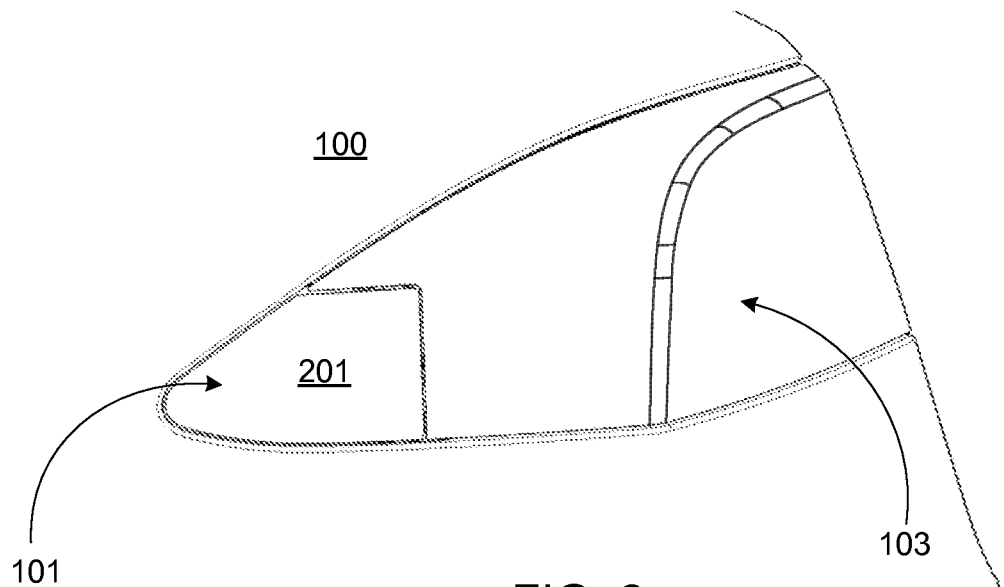
FIG. 2 provides an external side view of the lamp assembly of the vehicle shown in FIG. 1 with the charge port access door closed.
Figure 3:
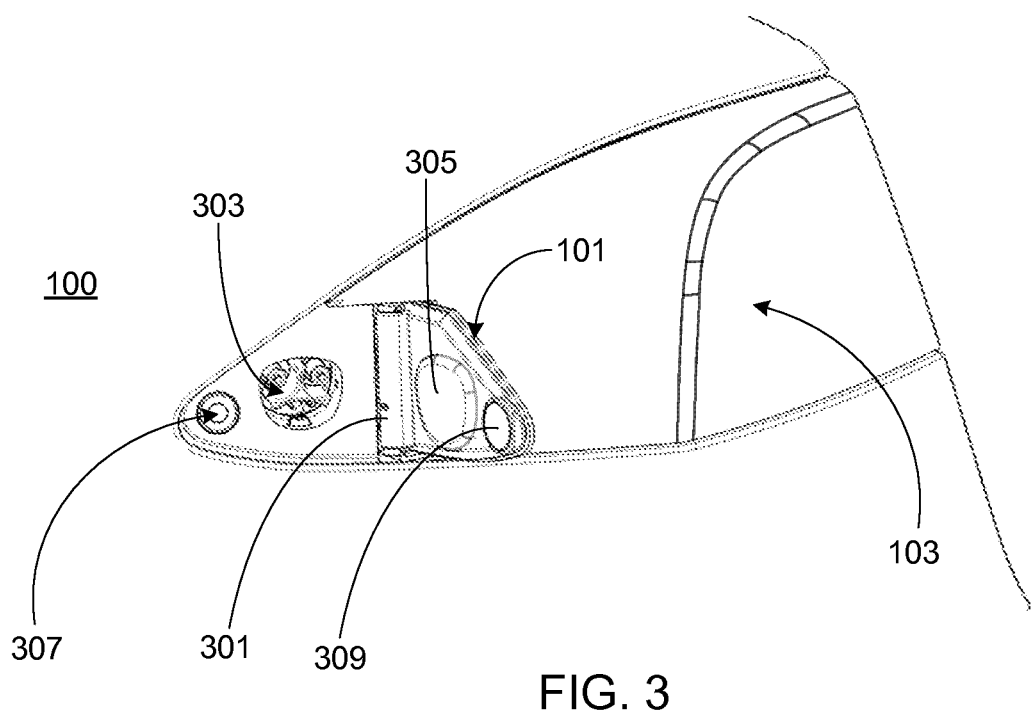
FIG. 3 provides an external side view of the lamp assembly of the vehicle shown in FIG. 1 with the charge port access door open.

FIGS. 1-3 illustrate a charge port door 101 integrated into a vehicle 100. In this exemplary embodiment, the charge port door is integrated into the rear vehicle lamp and reflector assembly 103 and utilizes an electromagnetic latching mechanism such as that described in co-pending and co-assigned U.S. patent application Ser. No. 13/482,900, filed 29 May 2012, the disclosure of which is incorporated herein for any and all purposes. It should be understood, however, that the present invention is not limited to this particular latching mechanism, nor is the present invention limited to a charge port. Rather, the present invention is applicable to both charge ports and fuel filler ports, to port assemblies mounted at any vehicle location (e.g., lamp assembly, front fender, rear fender, other vehicle panels and body members, etc.), and to any latching mechanism that may be configured to be remotely activated (e.g., solenoid latch assemblies, electromagnet latch assemblies, motor driven latch assemblies, and motor driven cable latch assemblies, etc.).

FIGS. 2 and 3 provide external side views of the lamp assembly 103 of vehicle 100 and charge port door 101 with the door closed and opened, respectively. In this exemplary configuration, the exterior surface of charge port door 101 is covered with a reflector 201, thus allowing the charge port door to blend into the lamp and reflector assembly 103. Door 101 is preferably spring loaded, thus causing the door to at least partially open about hinge axis 301 when the latching mechanism is released. With door 101 open, charge port 303 is visible as is port seal 305. In the illustrated embodiment, a portion 307 of the latching mechanism is located within the charge port assembly integrated into the vehicle while a secondary portion of the latching mechanism 309 is located on the complimentary surface of door 101.

In accordance with the invention, a system is provided that allows the fuel port of a vehicle to be remotely opened using a universal opener mounted to, or integrated within, the fuel delivery coupler. In the present specification, the term "fuel" refers to a fuel suitable for use with a combustion engine, e.g., gasoline, or suitable for use with an electric vehicle, e.g., a battery charging source. Accordingly, as used herein a vehicle fuel port refers to a fuel filler port that is coupled to the vehicle's gas tank, as well as to a charge port that is coupled to the vehicle's battery(s) and charging system. Similarly, as used herein a fuel coupler refers to a fuel nozzle that is designed to fit within the fuel filler port and transfer gas from the gas station or other source to the vehicle's gas tank, as well as to a charging connector that is designed to interface with the vehicle's charge port and transfer electrical energy from the source (e.g., wall outlet, charging station, etc.) to the vehicle's battery(s) and charging system.

Figure 4:
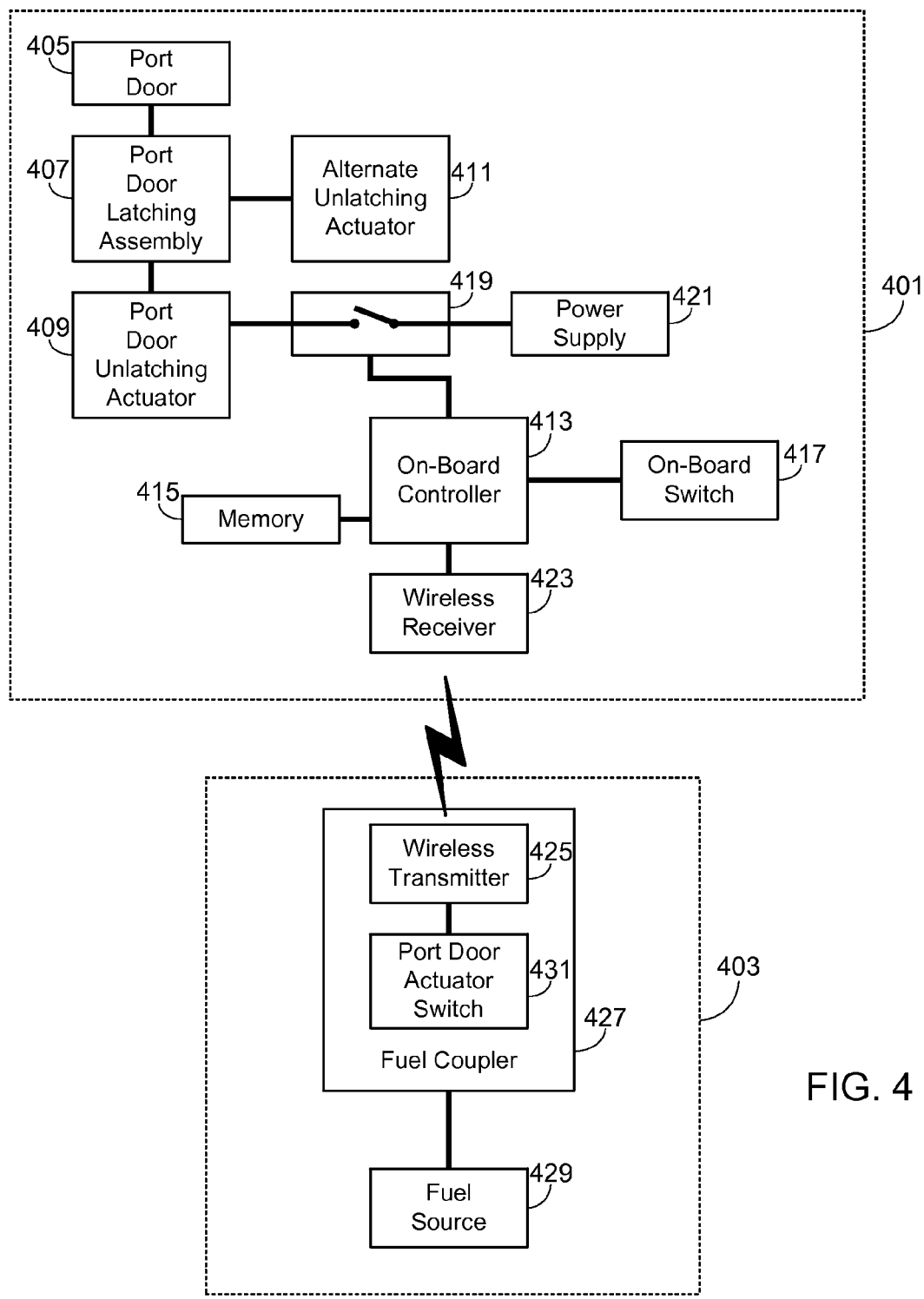
FIG. 4 provides a block diagram that illustrates the primary elements of the remote unlatching system of the invention.

As illustrated in the block diagram shown in FIG. 4, the system of the invention includes two primary subsystems, one of which is associated with the vehicle, i.e., subsystem 401, and the second of which is associated with the fuel delivery system, i.e., subsystem 403. Vehicle subsystem 401 includes a port door 405 that covers the vehicle's fuel port and protects the port assembly from the weather and other forms of contamination (e.g., dust, road debris, etc.) as well as possible acts of vandalism and tampering (e.g., placing contaminants into the fuel line/tank, destroying or blocking the contacts of a charge port, etc.). Coupled to port door 405 is a latching assembly 407 that is used to hold the port door closed. While some port doors are opened manually at the door using a push-push latching mechanism or a finger-hold or other port door handle, most modern vehicles use a latching mechanism that requires that the user unlatch the port door from within the passenger cabin using a button or cable pull lever. Although the use of a passenger mounted unlatching switch allows the port door to be effectively locked by simply locking the passenger cabin, this approach is not without its drawbacks. For example, it is quite common for the driver to leave the passenger compartment and get the gas nozzle or charging connector in hand before remembering to unlatch the port door. In such a situation, the driver must replace the gas nozzle into the pump or replace the charging connector into the charging station, re-enter the car, search for the port unlatching switch, open the port door, exit the passenger compartment, and re-obtain the gas nozzle or charging connector before he or she can begin filling the gas tank or charging the car's batteries. The present invention overcomes this problem.

In accordance with a preferred embodiment of the invention, latching assembly 407 is coupled to an unlatching actuator 409. It will be appreciated that the design of actuator 409 depends upon the type of latching assembly 407. For example, if the latching assembly is released by supplying power to a solenoid or an electromagnet or a latch drive motor, then actuator 409 is simply a switch that closes the necessary circuit to supply the power required to activate the solenoid or electromagnet or drive motor. If the latching assembly uses a spring loaded latch or other assembly that relies on a cable being pulled, then actuator 409 may be a solenoid or a small motor coupled to the cable so that when the solenoid or motor receives power, the cable is pulled and the door is released. Accordingly, it should be understood that actuator 409 is simply an electrical or electro-mechanical device that, when activated, actuates the door release mechanism of latching system 407. Note that actuator 409 may be the only means for activating the latching assembly 407 and releasing port door 405, or the latching assembly 407 may also be coupled to an alternate unlatching actuator 411, for example a switch or lever mounted within the passenger compartment.

In general, actuator 409 is activated by supplying it with electrical power from an on-board battery. An on-board control system 413 determines when electrical power is to be supplied to actuator 409. Typically on-board control system 413 includes a control processor as well as memory 415 for storing a preset set of control instructions. Control system 413 may be a dedicated control system or integrated into another vehicle control system, for example a vehicle management system. In at least one embodiment, controller 413 is coupled to an on-board switch 417, for example a switch mounted in the passenger compartment or integrated into a vehicle interface, e.g., a soft button on a touch-screen display interface. On-board switch 417 may be in addition to alternate unlatching actuator 411, or in lieu of alternate unlatching actuator 411. When controller 413 receives an "open port door" control signal from on-board switch 417, it closes switch 419, thereby providing power from power supply 421 to port door unlatching actuator 409. As noted above, once activated, actuator 409 releases the latching system holding port door 405 closed, thus causing door 405 to open.

In accordance with the invention, on-board control system 413 is also coupled to a wireless receiver 423. When receiver 423 receives an "open port door" control signal from wireless transmitter 425, it sends an "open port door" control signal to controller 413 which, in turn, closes switch 419, thereby providing power from power supply 421 to port door unlatching actuator 409 causing port door 405 to open. Wireless transmitter 425 is integrated into a charging connector or fuel nozzle 427, connector/nozzle 427 being coupled to the fuel source 429 (e.g., charging source or gas pump) corresponding to fuel delivery subsystem 403. A user activates wireless transmitter 425, and in particular causes wireless transmitter 425 to send the "open port door" signal, by depressing or otherwise toggling a switch 431. To maximize user convenience, preferably switch 431 is mounted to, or integrated into, charging connector/fuel nozzle 427, thus allowing the user to easily depress or otherwise toggle switch 431 while they are getting ready to connect the charging connector to the charge port or to insert the fuel nozzle into the fuel intake port. Alternately, switch 431 may be mounted separately from coupler 427.

As noted above, the fuel delivery subsystem 403 includes a wireless transmitter 425 that is used to transmit a control signal that is received by receiver 423 requesting that vehicle subsystem 401 open the port door 405. Accordingly, at a minimum subsystem 403 requires a suitable transmitter 425 and subsystem 401 requires a corresponding receiver 423. In at least one embodiment, however, both transmitter 425 and receiver 423 are transceivers, thus allowing subsystems 401 and 403 to both transmit and receive data in addition to the port door actuation signal. For example, if the fuel is gas, exemplary information that may be communicated between the two subsystems includes fuel tank level, octane requirements, available octane levels at the pump, price per gallon/liter, etc. Similarly, if the fuel is energy to charge an on-board battery pack, exemplary information that may be communicated between the two subsystems includes current battery pack state-of-charge (SOC), desired SOC, desired/available charge rates, cost, desired charge time completion, etc.

Transmitter 425 is purposefully a short range device (SRD), preferably with a data transmission range of between 1 and 4 meters, more preferably with a range of between 1 and 3 meters, and still more preferably with a range of between 1 and 2 meters. Additionally, in at least one preferred embodiment, reception of the "open port door" control signal requires line-of-sight between coupler 427 and port door 405. The reason that transmitter 425 is configured as an SRD, and more preferably an SRD that requires line-of-sight for control signal reception, is to avoid the port door of unintended vehicles from being opened when the "open port door" control signal is transmitted by transmitter 425. Typically the power output level of transmitter 425 is less than 25 watts; alternately, less than 10 watts; alternately, less than 1 watt; alternately, less than 50 milliwatts; alternately, in the range of 0.5 to 10 milliwatts. To achieve line-of-sight performance, preferably a directional antenna is used with transmitter 425. In at least one embodiment, the directional antenna is integrated into the fuel coupler 427 such that the high gain beam emitted by the directional antenna approximately coincides with the charge connector if coupler 427 is a charging connector, and coincides with the gas nozzle if coupler 427 is a gas coupler. As a result, as the user approaches the port door 405 and points coupler 427 at the door in readiness for attaching the coupler to the port assembly, when switch 431 is toggled the output of transmitter 425 is directed at the desired location, i.e., port door 405.

Figure 5:
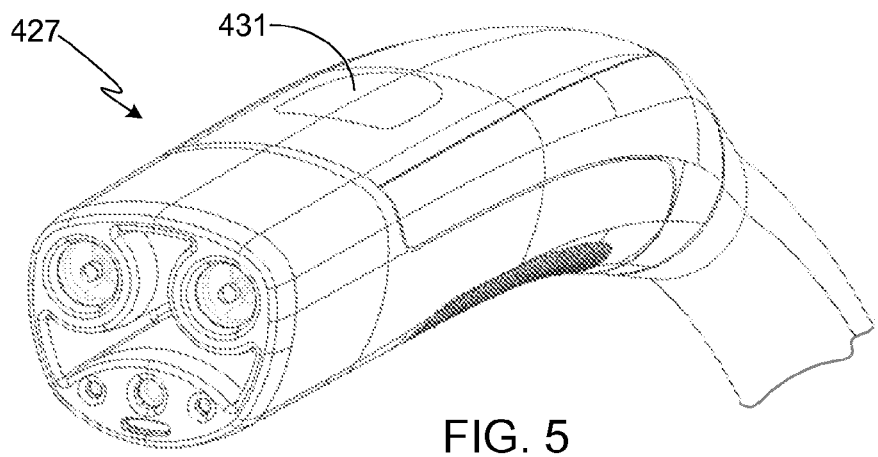
FIG. 5 provides a perspective view of an exemplary coupler with an integrated port door unlatching actuator switch per the invention.
Figure 6:
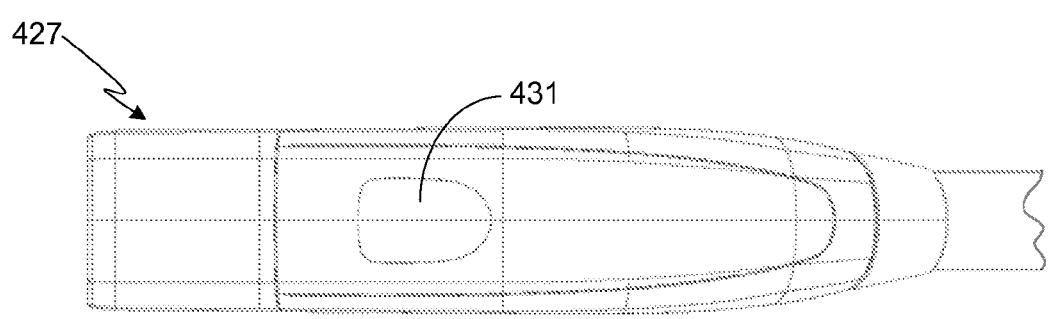
FIG. 6 provides a top view of the exemplary coupler shown in FIG. 5.
Figure 7:
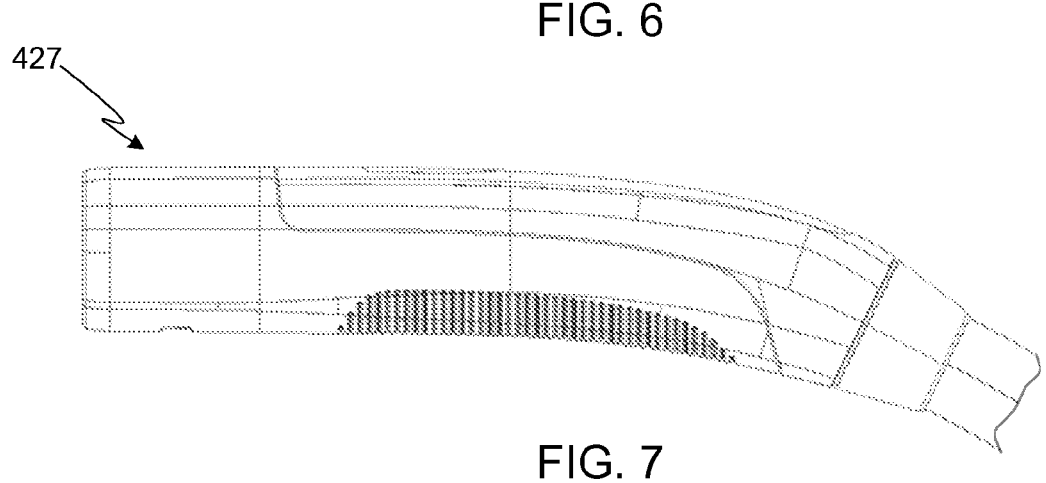
FIG. 7 provides a side view of the exemplary coupler shown in FIGS. 5 and 6.

FIGS. 5-7 illustrate an exemplary coupler 427, these figures providing front perspective, top and side views, respectively. As shown, a switch (e.g., a button) 431 is integrated into the top surface of the coupler, thus allowing the user to open port door 405 by simply depressing on button 431. Note that while the illustrated coupler is a charge port connector, as noted above the present application is equally applicable to a fuel line coupler (e.g., a gas nozzle).

Figure 8:
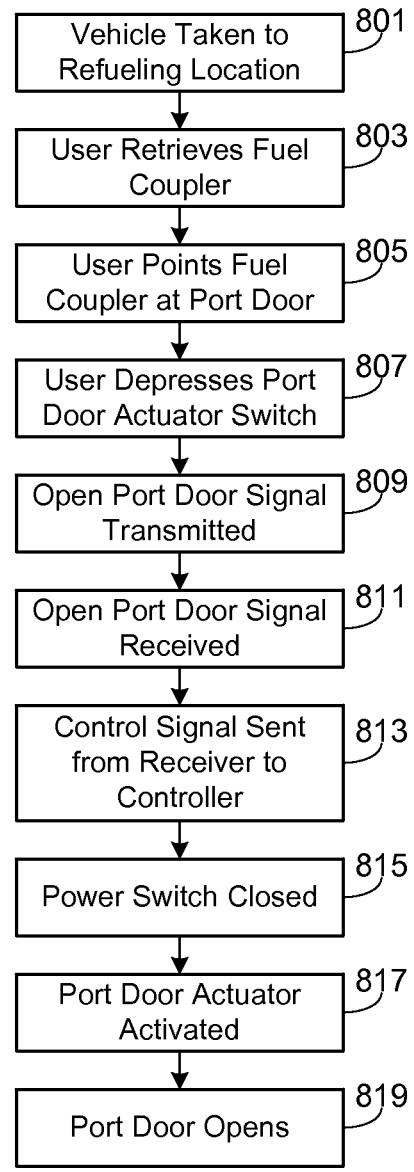
FIG. 8 illustrates the primary steps that occur during use of the invention.

FIG. 8 illustrates the primary steps that occur during use of the invention. Initially the user drives their car to the desired charging location (e.g., home garage, charging station at work, public charging station, etc.) or to the desired gas station (step 801). Then the user, or third party, retrieves the fueling coupler 427 (i.e., charging coupler or gas nozzle) from the stand-by location (e.g., charging station, gas pump) (step 803), points the coupler at the vehicle, preferably in the general direction of the port door (step 805) and depresses or otherwise activates switch 431 (step 807). After switch 431 is activated, transmitter 425 transmits an "open port door" control signal (step 809). Preferably transmitter 425 continues to transmit this control signal for as long as switch 431 is depressed or otherwise activated, thus allowing the user to continue to reposition/re-aim the coupler at the vehicle and the port door until the port door opens. Alternately, the system can be configured to transmit the "open port door" control signal for a preset period of time for each instance that switch 431 is depressed/activated. After transmitting step 809, the "open port door" control signal is received by on-board receiver 423 (step 811). Preferably the "open port door" control signal is a universal signal, for example a control signal recognized by all electric vehicles, or all combustion engine vehicles, or all vehicles of a certain make or model, or all vehicles in which the owner has paid a fee or is otherwise selected. In at least one alternate configuration, the control signal is matched to a particular vehicle, or to a small set of vehicles (e.g., owned by the same party). This alternate configuration is primarily of use when the owner of the fuel source, e.g., a charging station, wishes to control access to the source. For example, an employer may wish to control use of a charging station located within the company garage or similar location.

After the on-board receiver 423 receives the "open port door" control signal, a control signal is transmitted from receiver 423 to the on-board controller 413 indicating that an "open port door" signal has been received (step 813). Controller 413 then closes switch 419 (step 815), thereby providing power to the port door unlatching actuator 409 (step 817) causing port door 405 to open (step 819). Once port door 405 is open, charging or gas tank filling can commence. Note that in at least one embodiment, in addition to opening port door 405 upon receipt of the "open port door" control signal, controller 413 also performs whatever additional steps may be necessary to allow insertion of the fuel coupler into the port assembly.

Figure 9:
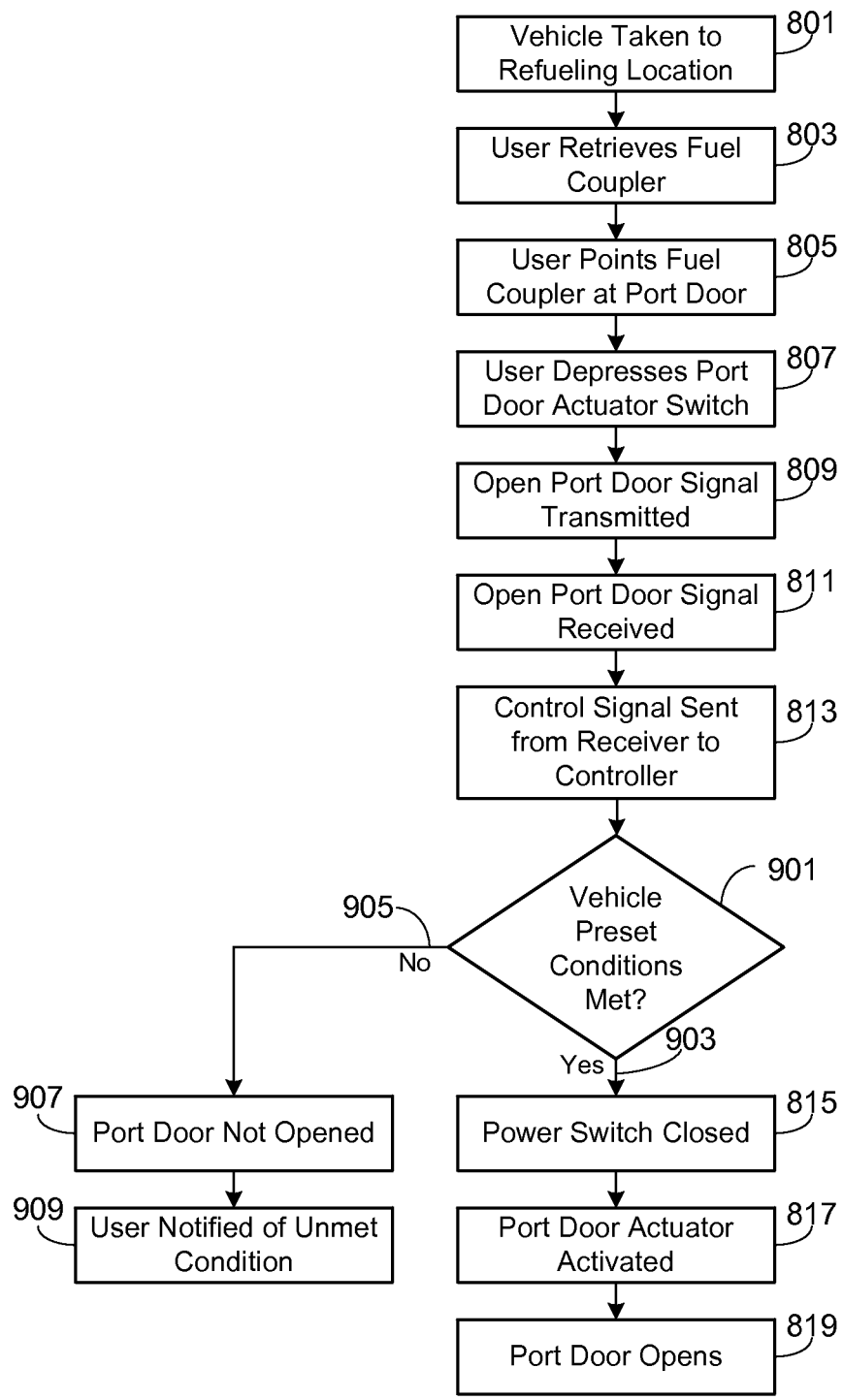
FIG. 9 illustrates a modification of the process shown in FIG. 8.

In the embodiment described relative to FIG. 8, controller 413 activates the unlatching actuator 409 as soon as the "open port door" is received by receiver 423. In an alternate process illustrated in FIG. 9, after the on-board controller 413 receives the "open port door" control signal from receiver 423, the controller determines if all vehicle preset conditions have been met (step 901) prior to opening the port door. If the preset conditions have been met (step 903), then controller 413 then closes switch 419 (step 815), thereby providing power to the port door unlatching actuator 409 (step 817) causing port door 405 to open (step 819). If the preset conditions have not been met (step 905), then the port door is not opened (step 907). Preferably controller 413 also notifies the user (step 909) so that they are aware of the problem, rather than thinking that there is simply a malfunction in the port door unlatching system. Exemplary methods of notifying the user include (i) honking the horn, (ii) illuminating a dashboard warning indicator, (iii) providing a warning and/or a description of the problem on a vehicle user interface (e.g., vehicle display screen), (iv) illuminating a warning light at the port assembly (e.g., an illumination ring/light proximate to the port door), (v) flashing the exterior vehicle lights, and/or (vi) sending a text message via email or a cellular network to the user. Exemplary conditions that may be preset and reviewed by controller 413 prior to opening the port door include (i) status of the passenger cabin locks (i.e., cabin locked/unlocked), (ii) whether or not the vehicle is in park, (iii) whether or not the vehicle motor is running for a conventional vehicle with a combustion engine or if the vehicle is 'on' for an electric vehicle, and (iv) proximity of the user (e.g., determined by an RFID tag in the user's keyfob).

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A fuel delivery system, comprising:
a fuel coupler connected to a fuel source, wherein said fuel coupler is configured to be coupled to a vehicle fuel port and to transfer fuel from said fuel source to a vehicle via said vehicle fuel port;
a transmitter configured to wirelessly transmit a vehicle port door control signal, wherein said transmitter is a short range device; and
a transmitter switch integrated into said fuel coupler, wherein toggling said transmitter switch causes said transmitter to wirelessly transmit said vehicle port door control signal, wherein receipt of said vehicle port door control signal by a receiver located within said vehicle activates a port door unlatching actuator that opens a vehicle port door, said vehicle port door hingeably coupled to said vehicle, wherein in a closed position said vehicle port door covers said vehicle fuel port and in an open position said vehicle port door provides access to said vehicle fuel port.

2. The fuel delivery system of claim 1, wherein said vehicle fuel port is comprised of a charge port electrically connected to a vehicle battery pack, wherein said fuel source is comprised of a charging source of electrical power, and wherein said fuel coupler is a charging connector.

3. The fuel delivery system of claim 1, wherein said vehicle fuel port is comprised of a filler port connected to a vehicle fuel tank, wherein said fuel source is comprised of a source of gasoline, and wherein said fuel coupler is a gasoline nozzle connected to said source of gasoline via a gasoline pump.

4. The fuel delivery system of claim 1, wherein said transmitter has a data transmission range of less than 4 meters.

5. The fuel delivery system of claim 1, wherein said transmitter has an output power of less than 10 watts.

6. The fuel delivery system of claim 1, wherein said transmitter has an output power of less than 1 watt.

7. The fuel delivery system of claim 1, further comprising a directional antenna integrated into said fuel coupler, wherein said directional antenna is electrically connected to said transmitter.

8. The fuel delivery system of claim 1, wherein said receiver requires a line-of-sight with said transmitter in order to receive said vehicle port door control signal.

9. The fuel delivery system of claim 1, wherein toggling said transmitter switch causes said transmitter to wirelessly transmit said vehicle port door control signal for a preset period of time.

10. The fuel delivery system of claim 1, wherein said transmitter wirelessly transmits said vehicle port door control signal for as long as said transmitter switch is toggled.

11. The fuel delivery system of claim 1, wherein said vehicle is any one of a plurality of vehicles configured to receive said vehicle port door control signal from said transmitter and activate said port door unlatching actuator in response to said vehicle port door control signal.

12. The fuel delivery system of claim 1, wherein said vehicle is any one of a plurality of vehicles manufactured by a specific manufacturer and configured to receive said vehicle port door control signal from said transmitter and activate said port door unlatching actuator in response to said vehicle port door control signal.

13. The fuel delivery system of claim 1, wherein said vehicle is any one of a plurality of vehicles of a particular manufacturer and model.

14. A method of operating a fuel delivery system, the method comprising the steps of:
- providing a fuel coupler connected to a fuel source, wherein said fuel coupler is configured to be coupled to a vehicle fuel port and to transfer fuel from said fuel source to a vehicle via said vehicle fuel port;
- providing a switch integrated into said fuel coupler, wherein toggling said switch from a first position to a second position further comprises the step of;
- transmitting a vehicle port door control signal from a directional antenna integrated into said fuel coupler in response to toggling said switch, wherein receipt of said vehicle port door control signal by a receiver integrated into a vehicle proximate to said fuel coupler further comprises the step of;
- activating a port door unlatching actuator that opens a vehicle port door, said vehicle port door hingeably coupled to said vehicle, wherein in a closed position said vehicle port door covers said vehicle fuel port and in an open position said vehicle port door provides access to said vehicle fuel port.

15. The method of claim 14, wherein said vehicle fuel port is comprised of a charge port electrically connected to a vehicle battery pack, wherein said fuel source is comprised of a charging source of electrical power, and wherein said fuel coupler is a charging connector.

16. The method of claim 14, wherein said vehicle fuel port is comprised of a filler port connected to a vehicle fuel tank, wherein said fuel source is comprised of a source of gasoline, and wherein said fuel coupler is a gasoline nozzle connected to said source of gasoline via a gasoline pump.

17. The method of claim 14, wherein said step of transmitting said vehicle port door control signal is performed for a preset period of time in response to toggling said switch from said first position to said second position.

18. The method of claim 14, wherein said step of transmitting said vehicle port door control signal is performed for as long as said switch is in said second position.

* * * * *